US006171639B1

(12) United States Patent
Vella

(10) Patent No.: US 6,171,639 B1
(45) Date of Patent: Jan. 9, 2001

(54) METHOD OF MANUFACTURING A LEMON-BASIL GARLIC MARINADE

(76) Inventor: Salvatore Vella, 20 Julian Way, Marlboro, NJ (US) 07746

( * ) Notice: Under 35 U.S.C. 154(b), the term of this patent shall be extended for 0 days.

(21) Appl. No.: 09/472,277

(22) Filed: Dec. 27, 1999

(51) Int. Cl.⁷ ........................................................ A23L 1/24
(52) U.S. Cl. ........................... 426/652; 426/589; 426/602
(58) Field of Search ..................................... 426/589, 652, 426/129, 602

(56) References Cited

PUBLICATIONS

Sacramento Bee Aug. 13, 1997 Section:Taste, p. 1.*
Diabetes in The News, v. 9, N. 3, p. 58, 1990.*
Restaurants & Institutions V. 99, n. 27 p. 148 Oct. 16, 1989.*
Parents Magazine V. 63, N. 7, p. 120(8) Jul. 1988.*
New Orleans Times Picayune Apr. 20, 1989, Section:ff, p. F1.*
New Orleans Times Picayune Apr. 26, 1990, Section:ff, p. F2.*
Rocky Mountain News, Apr. 5, 1992, Section: Sun.-Mag./Travel, p. 24M.*
Houston Post Feb. 10, 1993, Section:Food, p. F1.*
Sacramento Bee May 20, 1998, Section:Taste, p. 63.*
Record Sep. 23, 1990.*
New York State Conserovativnist V. 53, n. 2 p. 10(2) Oct. 1998.*
Chatelaine, V. 69, n. 7, p. 58(9) Jul. 1996.*
Wisconsin State J. Jul. 20, 1994 Section: Daybreak p. 1C.*
Fresno bee Jul. 8, 1992, Section:Food, p. :EE1.*
Fresno Bee May 13, 1998, Section:Life, p. E3.*
State Jul. 16, 1997, Section:Food, p. D3.*
Atlanta Journal–Constitution Aug. 28, 1997 Section:Food p. H4.*
Beacon Journal Jun. 4, 1997 Section:Lifestyle p. E1.*
Richmond News Leader Oct. 4, 1990 Section:Food, p. H1.*
Oregonian Jun. 3, 1997 Section:Foodday, p. FDO8.*
Star Tribune Jul. 23, 1989 Section:Taste p. 01T.*
Star Tribune Jul. 23, 1989 Section:Taste p. 0iT.*
Miami Herald Jul. 25, 1992 Section:Living Today p:3E.*
Countryside & small Stock J. V. 77, n.6, p. 15(1) Nov./Dec. 1993.*
Atlanta Journal Jun. 10, 1990 Section:Dixie Living, p.:M02.*
Dailey News of Los Angeles Apr. 22, 1993 Section:Ford, p.:H1.*
Changing Times Mar. 1985, p. 26.*
Int'l New Product Report (11) Jun. 1, 1990, p. 25.*
Food Packer International 13(1) Jan. 1998, p. 17.*

* cited by examiner

Primary Examiner—Steven Weinstein
(74) Attorney, Agent, or Firm—Charles I. Brodsky

(57) ABSTRACT

A method for preparing a lemon-basil garlic marinade, which combines an Italian dressing with water, granulated garlic and dried basil at room temperature, where both the granulated garlic and dried basil are slowly poured into the mixture and easily stirred, and where the Italian dressing is a blended dressing including lemon juice as an ingredient.

1 Claim, No Drawings

METHOD OF MANUFACTURING A LEMON-BASIL GARLIC MARINADE

FIELD OF THE INVENTION

This invention relates to the field of condiments, in general, and to a lemon-basil garlic marinade for poultry and fish products, in particular.

SUMMARY OF THE INVENTION

As will become clear from the discussion that follows, the lemon-basil garlic marinade of the invention includes an Italian dressing mixed with water at a rate of substantially six gallons of water per twenty gallons of dressing—with granulated garlic then being poured in, and with the mixture so formed being easily stirred for a period of approximately three to four minutes. Dried basil is then poured in further, and easily stirred for another four to five minutes to produce the marinade. Experimentation has shown that the resultant taste afforded will be uniform throughout the mix if the ingredients are poured in slowly—with the easy stirring and slow pouring all being done at room temperature. Being then immediately ready as a marinade—especially for a boneless and skinless turkey breast—experimentation has shown that additional refrigeration after use prolongs the taste of the marinade, and produces optimal results.

Experimentation has further shown that uniformity of taste results when using an Italian dressing which is blended (i.e. one where, upon sitting, the oil does not rise to the top with the spices settling to the bottom) and enhanced taste results when lemon juice is included as an ingredient of the dressing.

As will also become clear, the lemon-basil garlic marinade so described, according to a preferred embodiment of the invention, is mixed in a vessel containing a mixture of the blended Italian dressing and water in proportions of six gallons of water for each twenty gallons of dressing. Into the mixture thus produced, the granulated garlic is then slowly poured (for example, over a period of approximately two minutes) and slowly stirred for a period of approximately three to four minutes to produce a second mixture. Into this second mixture, the dried basil is similarly slowly poured (for example, over a period of approximately one and one-half minutes) while being likewise easily stirred for a period of another four to five minutes. The resulting marinade is then immediately ready to be basted over a turkey breast or turkey london broil, or over such fish as halibut—for placement in an oven or on a grill for that matter. That portion of the marinade which is not so basted or poured onto the poultry or fish product could be refrigerated for later use. A marinade made according to this method can be easily packaged in half pint, full pint and quart containers as circumstances dictate.

DETAILED DESCRIPTION OF THE INVENTION

In accordance with the invention, a preferred lemon-basil garlic marinade of the invention for poultry and fish products is one which comprises ingredients of vegetable oil, water, vinegar, sugar, garlic, salt, onion, red bell pepper, spices, various preservatives and lemon juice, uniformly blended together. Because of the "lemon juice" ingredient, such dressing has a taste which is quite appealing for turkey breast, turkey london broil and halibut.

In formulating the marinade according to the invention, the blended Italian dressing employed is mixed—in a drum, for example—along with tap water, at a rate of substantially six gallons of water for each twenty gallons of dressing to produce a first mixture.

Granulated garlic is then slowly poured in at a rate of two and one-half quarts per twenty gallons of dressing, and easily stirred for a period of approximately three to four minutes. In so doing, a wood, brass or aluminum stick—some two-three feet in length—may be employed, with the granulated garlic being added over a period of approximately two minutes. As with the mixing of the blended Italian dressing with the tap water, this slow pouring in, and easy stirring of, the granulated garlic is done at room temperature.

Dried basil, then, is slowly poured in at a rate of one pint for each twenty gallons of dressing, and easily stirred for a period of about four to five minutes to produce the marinade. To ensure the uniform distribution of the dried basil, its addition is over a period of approximately one and one-half minutes. Also being done at room temperature, the easy stirring of the dried basil, without any heat being added, provides a very satisfying dissolving with the blended dressing.

In accordance with the invention, the resulting marinade is ready for basting, without any need for refrigeration or to sit for any extended length of time to allow settling to occur. Experimentation has shown that when poured in, stirred and mixed in this manner, the granulated garlic and the dried basil becomes uniformly distributed with the various ingredients of the blended Italian dressing. The resultant taste for the marinade so made has been noted to be uniform throughout, at all locations.

The marinade of the invention can then be divided, as desired, into half-pint, full pint and quart containers, for use on poultry and fish products, either ready to eat, or to be placed in an oven or on a grill. Further experimentation has shown that the uniform taste exhibited can be extended in life by further refrigeration of the remainder of the marinade which is not used by the consumer as a condiment for the food being eaten. In this respect, uniformity of taste throughout is of the utmost importance, and is obtained by the slow pouring and easy stirring of the granulated garlic and the dried basil together with the blended Italian dressing. By providing a "lemon juice" flavor to the resulting mix, a marinade results whose taste is quite appealing when the marinade is applied to a turkey breast (either boneless or boneless-and-skinless), to a turkey london broil and to such fish as halibut. In those instances, furthermore, the lemon-basil garlic marinade which results could be packaged together with the turkey breast, the turkey london broil or with the halibut (or any other similar fish) in a sealed Cryovac package, or can be alternatively packaged with the poultry or fish product itself immersed in the marinade.

While there has been described what is considered to be a preferred embodiment of the invention, it will be appreciated that modifications can be made by those skilled in the art without departing from the scope of the teachings herein. That is, whereas Applicant has described a particular composition for a particular Italian dressing which has proved useful in the invention, other variations of ingredients might be employed, but with the features of the invention still following, as long as the dressing is one which is blended, and which provides a "lemon juice" taste, and as long as the granulated garlic and dried basil which are thereafter added can be easily stirred into the dressing when mixed with water to allow for the required uniformity of distribution. For at least such reason, therefore, resort should be had to the claims appended hereto for a complete understanding of the scope of the invention.

I claim:

1. A method for commercially producing bulk quantities of a lemon-basil garlic marinade for poultry and fish products, of uniform distribution and ready for immediate use without prior refrigeration and/or settling time, comprising:

a) a first step of mixing a blended Italian dressing with water at a rate of substantially six gallons of water per twenty gallons of dressing to produce a first mixture;

b) a second step of slow pouring and easy stirring of granulated garlic into said first mixture for a period of approximately three to four minutes to produce a second mixture;

c) a third step of slow pouring and easy stirring of dried basil into said second mixture for a period of approximately four to five minutes to produce a marinade;

d) wherein each of said first, second and third steps are performed at room temperature;

e) wherein said blended Italian dressing includes lemon juice as an ingredient;

wherein said second step includes pouring of granulated garlic at a rate of two and one-half quarts per twenty gallons of blended dressing;

wherein said third step includes pouring of dried basil at a rate of one pint per twenty gallons of blended dressing;

wherein said second step includes the slow pouring of said granulated garlic into said first mixture over a period of approximately two minutes; and wherein said third step includes the slow pouring of said dried basil into said second mixture over a period of approximately one and one-half minutes.

* * * * *